United States Patent [19]
Leopold

[11] Patent Number: 5,327,457
[45] Date of Patent: Jul. 5, 1994

[54] OPERATION INDICATIVE BACKGROUND NOISE IN A DIGITAL RECEIVER

[75] Inventor: Raymond J. Leopold, Colorado Springs, Colo.

[73] Assignee: Motorola, Inc., Schaumburg, Ill.

[21] Appl. No.: 759,334

[22] Filed: Sep. 13, 1991

[51] Int. Cl.⁵ .................... H04B 17/00; H04B 1/10
[52] U.S. Cl. ........................................ 375/10; 375/104
[58] Field of Search .............. 375/10, 104; 370/13, 370/17; 455/25, 226.1, 156.1, 154.1; 371/15.1, 3

[56] References Cited

U.S. PATENT DOCUMENTS

| | | | |
|---|---|---|---|
| 3,174,150 | 3/1965 | Sferrazza et al. | 455/25 X |
| 4,996,717 | 2/1991 | Koenig | 455/222 |
| 5,151,922 | 9/1992 | Weiss | 375/104 |

FOREIGN PATENT DOCUMENTS

| | | |
|---|---|---|
| 0464911 | 6/1991 | Fed. Rep. of Germany . |
| 52-19909 | 2/1977 | Japan ................... 455/156.1 |

OTHER PUBLICATIONS

An article entitled "Graceful Degradation of Digital Audio Transmission Systems", by K. A. Schouhamer Immink, Philips Research Laboratories, 5600 JA, Eindhoven, The Netherlands, from J. Audio Eng. Soc., vol. 36, No. 12, 1988, Jan. and Feb.

Primary Examiner—Stephen Chin
Assistant Examiner—Tesfaldet Bocure
Attorney, Agent, or Firm—Eugene A. Parsons

[57] ABSTRACT

Providing a background noise generator in a digital receiver to produce a small, controlled amount of background noise in the audible output of the receiver to provide an indication to the operator of the continued operation of the receiver. A small amount of noise is generated, either separately or in the RF portion of the receiver, and introduced into the receiver, either in the audio portion or the digital portion, as background noise to provide the ambience of a standard receiver.

9 Claims, 2 Drawing Sheets

OPERATION INDICATIVE BACKGROUND NOISE IN A DIGITAL RECEIVER

The present invention pertains to digital receivers and more specifically to digital receivers that do not supply an audible indication of the status of the receiver.

BACKGROUND OF THE INVENTION

In digital receivers, received RF signals are converted to extract a digital signal which is supplied to a vocoder portion of the receiver to supply an audio output dependent upon the received input signal. During periods when either a very weak or no RF signal is received there is no audio output from the receiver. This lack of output creates a very poor ambience for the operator, since the operator does not know if the receiver has malfunctioned, no signal is being sent, or there is no audio being sent.

Some manufacturers have attempted to solve this problem by supplying a light on the control panel of the receiver which provides a limited indication of the operation or system acquisition of the receiver. One of the problems with this solution is that the operator must continually watch the control panel. This is not a practical solution, especially when the operator may be doing some other function while operating the receiver.

SUMMARY OF THE INVENTION

It is an object of the present invention to provide new and improved digital receivers in which operator ambience is greatly improved.

It is a further object of the present invention to provide digital receivers which include audible indications of the operation of the receiver.

It is a further object of the present invention to provide a method of improving the operator ambience of digital receivers.

It is still a further object of the present invention to provide a method of improving the operation of a digital radio which has a directional antenna or receives signals with different propagation paths.

These and other objects are realized by apparatus in a digital receiver for providing operation indicative background noise including a digital receiver with an RF portion, a digital portion and an audio portion, and a background noise generator having a background noise output coupled to one of the digital and the audio portions to provide background noise indicative of the operation of the receiver. One purpose is to make digital receivers sound more like the receivers with which operators are presently familiar.

These and other objects are further realized in a method of improving operator ambience in a digital receiver including the steps of providing a digital receiver with an RF portion, a digital portion and an audio portion, generating a background noise signal and supplying the generated background noise signal to the audio portion of the receiver.

BRIEF DESCRIPTION OF THE DRAWINGS

Referring to the drawings.

DESCRIPTION OF THE PREFERRED EMBODIMENT

Figure 1:
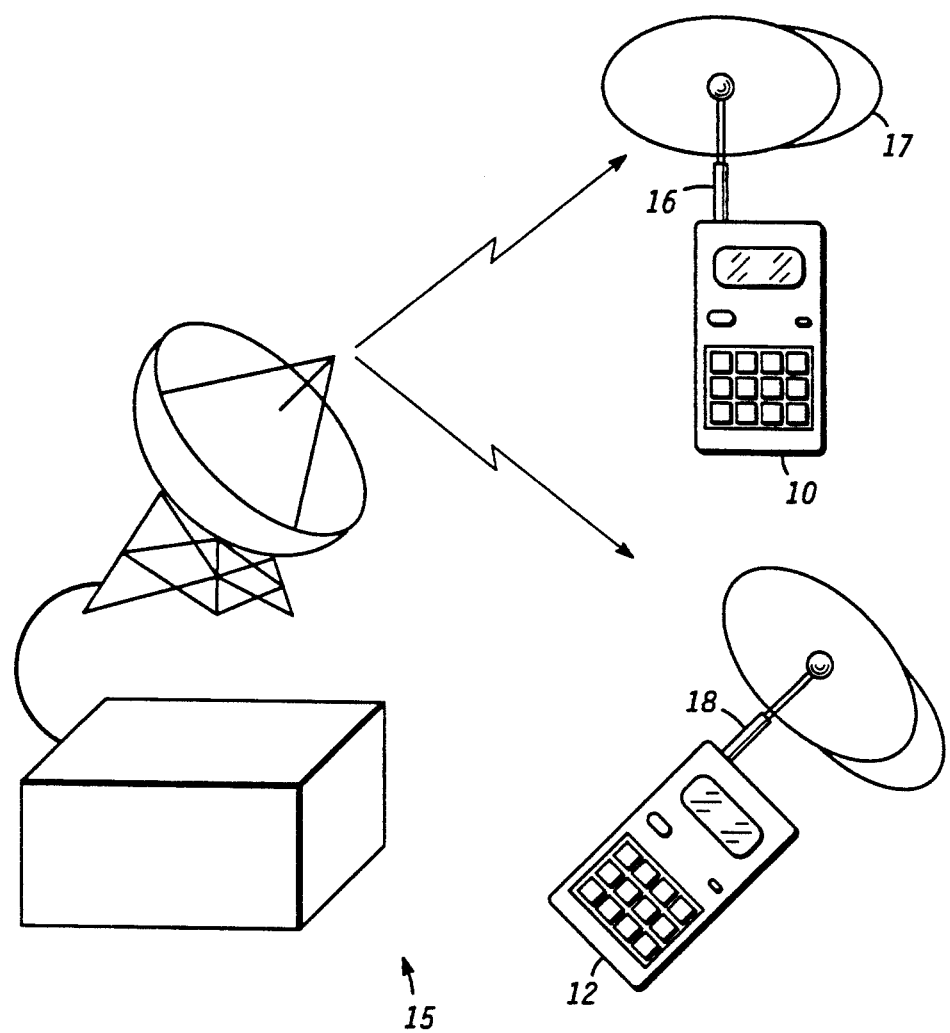
FIG. 1 is a view in perspective illustrating receivers in different orientations relative to a transmitter.

Referring specifically to FIG. 1, two digital receivers 10 and 12, having directional antennas, are illustrated in different orientations relative to a transmitter 15. Receiver 10 has an antenna 16 with a generally hemispherical receiving pattern 17 which, in FIG. 1, is oriented generally horizontally for maximum reception from transmitter 15. Receiver 12 has an antenna 18, similar to antenna 16 on receiver 10, but receiver 12 is rotated relative to transmitter 15 so that reception is greatly reduced. Digital receivers are primarily used in pagers, remote "wireless" telephones, terrestrial cellular phones and cellular phones for satellite based systems. Digital receivers can be used in any receiver used to receive audio information. It will of course be understood that digital receivers contain circuitry for converting the received analog RF signal to a digital signal and digital filtering which, by its nature, contains no background noise as is present in standard AM and FM receivers. Thus, loss of the received signal results in no audio output from the receiver. In some instances the rotation, or orientation, of receiver 12 may become so pronounced that reception of transmitted signals is lost completely, or is so low that they do not meet the receivers lower threshold. In such instances the receiver appears to be inoperative, since no indication of its correct operation is present.

The directional antennas 16 and 18 of FIG. 1 are simply one example of reasons for fading or loss of signals in receivers. Other examples can be moving out of a skip pattern, moving behind obstructions, losing a preferred path in a multipath system, a satellite passing overhead, etc. When receivers 10 and 12 are digital receivers and fading or loss of signal exceeds the lower reception threshold the audio output of the receivers drops to zero. In such instances the operator can not tell if the transmission stopped, the operator's receiver stopped working, the message ended, the receiver antenna needs re-orientation, etc. In the instance of the mis-oriented receiver antenna (receiver 12 in FIG. 1) the operator would not know that the receiver antenna is mis-oriented or how to orient it so as to properly receive the transmitted signal. Even if an operating light is supplied on the control panel of receiver 12, the operator is only aware that receiver 12 is operating and has no indication that some re-orientation is required. For example, in some current cellular phones a light will come on indicating that the phone is in a usable service area but doesn't indicate the available margin. Thus, the phone may be next to the cellular repeater or just barely inside its range for a given antenna orientation.

Figure 2:
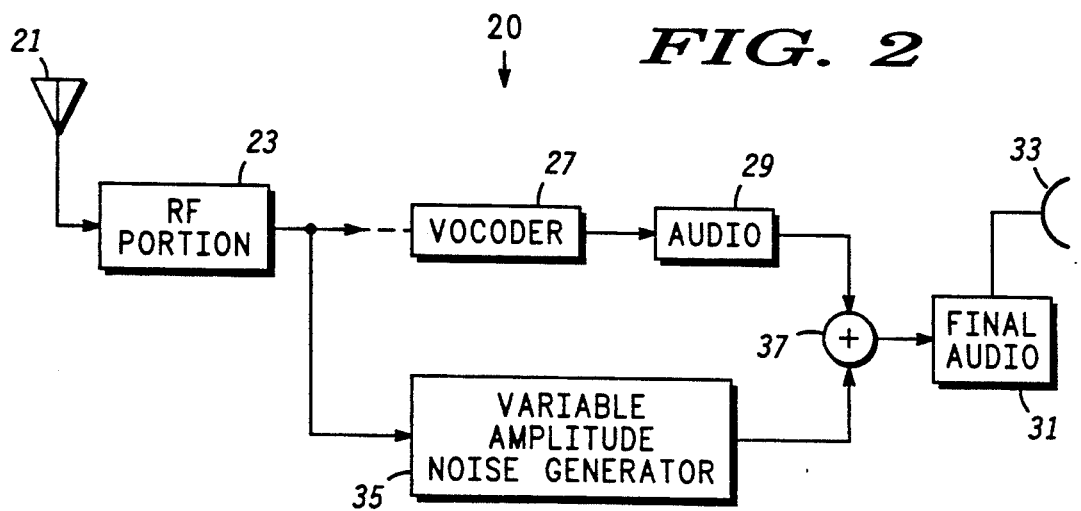
FIG. 2 is a simplified block diagram of a digital receiver embodying the present invention.

Referring specifically to FIG. 2, a simplified block diagram of a digital receiver 20 embodying the present invention is illustrated. Receiver 20 includes an antenna 21, an RF portion 23, a digital portion including vocoder 27, and an audio portion, including audio amplifiers 29 and final audio stage 31. Final audio stage 31 supplies signals to a transducer 33 which is a speaker, earphone, audio synthesizer or the like, for producing audible sounds.

A variable amplitude noise generator circuit 35 is connected to receive an input signal from the output of RF portion 23. Variable amplitude noise generator 35 supplies a background noise signal to final audio stage 31 through a mixer 37. In this preferred embodiment mixer 37 is situated between audio amplifiers 29 and final audio stage 31 to mix the noise signal with the audio signal supplied by audio amplifiers 29 but it will be understood that the noise generated by variable amplitude noise generator 35 can be introduced into the channel anywhere in the audio portion. In this specific embodiment the noise in variable amplitude noise generator 35 is generated by a noise diode, which is a commercially available device. The noise can be generated by a random frequency generator or, if RF portion 23 contains low frequency signal components, such as IF beat signals, a generator as simple as a one transistor amplifier having a linear or some more complex response can be utilized. The amplifier may include several stages of amplification and response adjustments if these are desirable for a specific application.

In this preferred embodiment the background noise introduced into the audio portion is strongest when signals in the RF portion (received signals) are weakest and, as the signals in the RF portion gain in strength, the background noise signal is reduced. Thus, as receiver 12 (FIG. 1) is reoriented toward better reception of the transmitted signal, the amplitude of the background noise is reduced and the operator knows the receiver is being moved in the correct direction. Generally, it is desirable to insert a small amount of background noise even when a proper received signal is present. This background noise improves operator ambience by continually assuring the operator that the receiver is operating properly. For example, during relatively long breaks in a conversation the operator is assured of correct operation and does not wonder whether there has been a break in communications.

Figure 3:
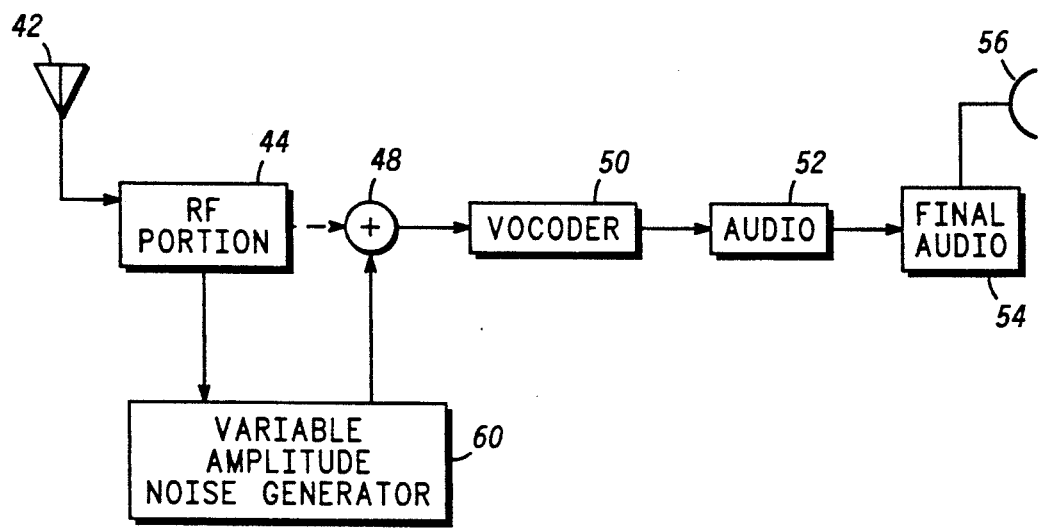
FIG. 3 is a simplified block diagram of another embodiment of a digital receiver constructed in accordance with the present invention.

Referring to FIG. 3, a different embodiment of a digital receiver 40 is illustrated in simplified block form. Receiver 40 includes an antenna 42, an RF portion 44, a digital portion including a mixer 48 and a vocoder 50 and an audio portion including an audio amplifier 52, a final audio stage 54 and an audio transducer 56. In this specific embodiment a variable amplitude noise generator 60 is provided which supplies a digital noise signal through mixer 48 to vocoder 50. A second input of mixer 48 receives the output signal from RF portion 44, after it has been digitized. It will of course be understood that the digital output signal of variable amplitude noise generator 60 can be a signal that produces a constant tone, a periodically interrupted audio tone (e.g. a beep), etc. Thus, digital noise is mixed with the digital signal in the digital portion of receiver 40 to provide some background noise to improve operator ambience.

In this embodiment variable amplitude noise generator 60 is controlled by the output signal of RF portion 44 so that the amplitude of the background noise is reduced as signal strength increases, where signal strength is measured at the output of RF portion 44. It will be understood that control signals can be developed in other portions of the receiver, if desired, for example the output of an automatic gain control, but the amplitude of the RF signal is a natural and available control signal.

In some applications it may be desirable to have a constant background noise signal and a continuous control of the amplitude is not necessary. In such instances a simple noise generator is used in place of variable amplitude noise generator 35 (FIG. 2) or 60 (FIG. 3) and the control line from RF portion 23 (FIG. 2) or 45 (FIG. 3) is not implemented.

Figure 4:
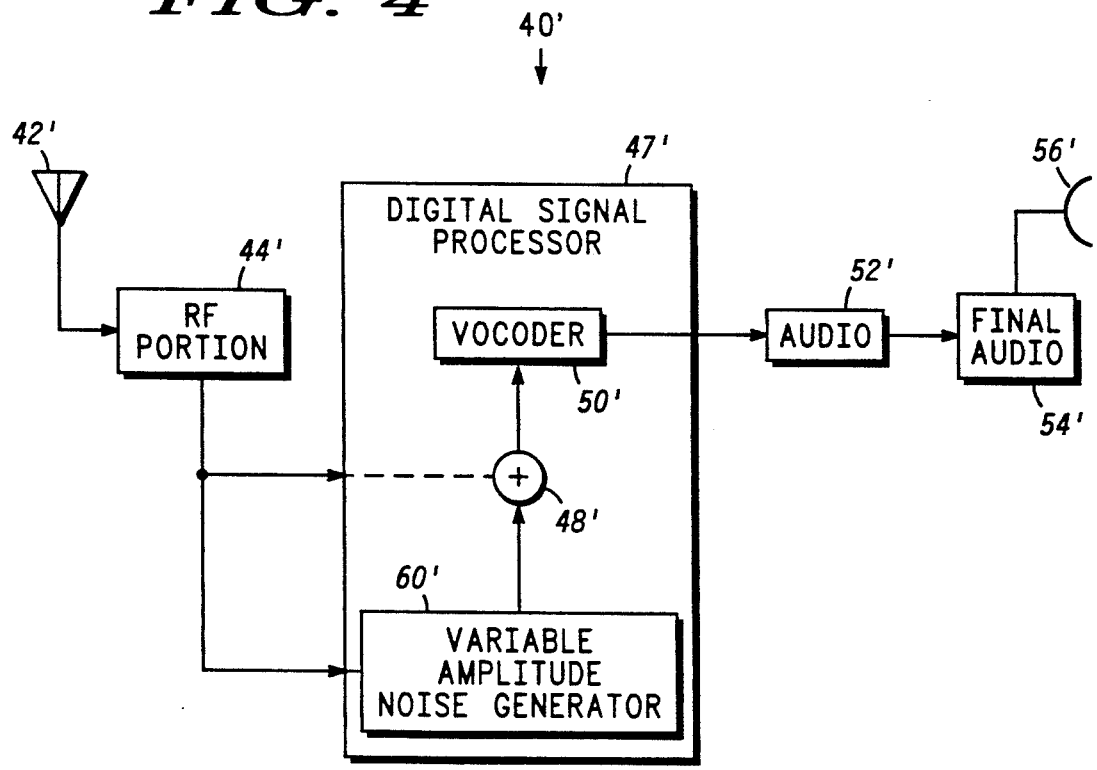
FIG. 4 is a simplified block diagram of another embodiment of a digital receiver, similar to FIG. 3.

In many digital receivers the digital portion of the receiver includes a digital signal processor (DSP), which ultimately supplies signals to vocoder 50, or similar circuitry. The DSP may be a microprocessor with a program, custom integrated circuits, boards etc. In some instances the vocoder operation may also be performed in the DSP. This specific embodiment is illustrated in FIG. 4 wherein components similar to FIG. 3 are designated with a similar numeral and all numerals have a prime (') added to indicate a different embodiment. A DSP 47' is illustrated as including mixer 48', vocoder 50' and variable amplitude noise generator 60'. In receiver 40', the noise generator function is performed in DSP 47', which is programmed to generate or pass a small amount of digital noise to vocoder 50'.

Thus, an improved digital receiver is disclosed which includes a background noise generating circuit to improve the operator ambience of the receiver. During periods when signals are not being received the operator hears a normal background noise to assure the correct operation of the receiver. Further, in instances where the receiver includes a directional antenna or there are multiple propagation paths the operator uses the background noise to properly orient the receiver and antenna for good reception. Generally, the background noise is inserted with a minimum amount of change and expense to the receiver.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. In a digital receiver, apparatus for providing operation indicative background noise comprising:
   a digital receiver including an RF portion, a digital portion and an audio portion, the digital portion being coupled to receive signals from the RF portion and provide the signals to the audio portion; and
   a background noise generator having a background noise output coupled to one of the digital or the audio portions to provide background noise indicative of the operation of the receiver.

2. Apparatus as claimed in claim 1 wherein the background noise generator includes a variable amplitude output the amplitude of which is controlled by a control input, the control input being coupled to the RF portion of the receiver to control the amplitude of the background noise coupled to the receiver.

3. Apparatus as claimed in claim 1 including in addition an antenna coupled to the RF portion, the antenna supplying input RF signals with an increased amplitude as the antenna is generally oriented in a direction of increased signal strength from a transmitting source of the RF signals.

4. In a digital communication system, apparatus for providing operation indicative background noise comprising:
   a digital receiver including an antenna, an RF portion connected to the antenna, a digital portion connected to receive signals from the RF portion, and an audio portion connected to the digital portion; and an amplitude controllable noise generator having a control signal input coupled to the RF portion and a signal output coupled to the digital portion, to provide background noise indicative of the operation of the receiver, the noise generator having the control signal input coupled to the RF portion to control the amplitude of the background noise in accordance with received signals.

5. In a digital communication system, apparatus for providing operation indicative background noise as claimed in claim 4 wherein the digital portion of the digital receiver includes a DSP and the DSP includes the amplitude controllable noise generator.

6. In a digital communication system, apparatus for providing operation indicative background noise as claimed in claim 4 wherein the amplitude controllable noise generator generates a background noise signal in response to a control signal from the RF portion of the receiver with an amplitude that is related to the amplitude of the received signal with the maximum amplitude occurring when the amplitude of the received signal is approximately zero.

7. A method of improving operator ambience in a digital receiver comprising the steps of providing a digital receiver including an RF portion, a digital portion and an audio portion coupled together to receive transmitted signals and produce an audio output in response thereto, generating a background noise signal and supplying the generated background noise signal to the digital receiver to produce background noise in the audio output.

8. A method as claimed in claim 7 wherein the step of generating a background noise signal includes the steps of sensing the amplitude of a received RF signal and generating a background noise signal with an amplitude that is related to the amplitude of the received signal with the maximum amplitude occurring when the amplitude of the received RF signal is approximately zero.

9. A method as claimed in claim 8 wherein the step of supplying a digital receiver includes the step of supplying a digital receiver with an antenna coupled to the RF portion, the antenna supplying input RF signals with an increased amplitude as the antenna is generally oriented in a direction of increased signal strength from a transmitting source of the RF signals.

* * * * *